United States Patent
Matsukura et al.

[11] Patent Number: 5,651,935
[45] Date of Patent: Jul. 29, 1997

[54] SPIRAL DIE AND LAMINATE PRODUCTION METHOD USING SAME

[75] Inventors: Yoshihiro Matsukura; Takahisa Ueyama, both of Niihari-gun, Japan

[73] Assignee: Kureha Kagaku Kogyo Kabushiki Kaisha, Tokyo, Japan

[21] Appl. No.: 531,075

[22] Filed: Sep. 20, 1995

[30] Foreign Application Priority Data

Sep. 21, 1994 [JP] Japan .................. 6-251628

[51] Int. Cl.$^6$ .............. B29C 47/06; B29C 47/20
[52] U.S. Cl. ............ 264/503; 264/146; 264/171.29; 264/209.2; 264/209.8; 425/133.1; 425/381; 425/462
[58] Field of Search .............. 264/146, 514, 264/173.15, 171.29, 209.2, 209.8, 503; 425/462, 133.1, 381

[56] References Cited

U.S. PATENT DOCUMENTS

| | | | |
|---|---|---|---|
| 3,558,755 | 1/1971 | Laban et al. | 264/171.27 |
| 3,769,397 | 10/1973 | Cook et al. | 264/209.8 |
| 3,966,861 | 6/1976 | Papesh et al. | 264/209.2 |
| 4,182,603 | 1/1980 | Knittel | 425/462 |
| 4,185,954 | 1/1980 | Murakami et al. | 425/462 |
| 4,687,430 | 8/1987 | Morris et al. | 425/462 |
| 4,731,216 | 3/1988 | Topolski | 264/503 |
| 4,770,837 | 9/1988 | Lu et al. | 264/209.2 |
| 4,784,594 | 11/1988 | Sharps, Jr. | 264/171.29 |
| 5,076,776 | 12/1991 | Yamada et al. | 425/462 |
| 5,261,805 | 11/1993 | Gates | 425/462 |
| 5,262,109 | 11/1993 | Cook | 264/171.29 |

FOREIGN PATENT DOCUMENTS

| | | | |
|---|---|---|---|
| 4218095 | 12/1993 | Germany | 425/133.5 |
| 57-80024 | 5/1982 | Japan | 264/171.29 |

*Primary Examiner*—Jeffery R. Thurlow
*Attorney, Agent, or Firm*—Wenderoth, Lind & Ponack

[57] ABSTRACT

A spiral die for forming a laminate includes an outer die ring, an inner die ring inserted into the outer die ring with a fit clearance therebetween, a plurality (m, a positive integer greater than 1) of spiral grooves each having a gradually decreasing depth disposed between the outer and inner die rings, and distribution paths for distributively introducing melted resin streams of a plurality (n, a positive integer satisfying n<m) of resin species in a prescribed order into said plurality (m) of spiral grooves. The individual resin streams distributed to the spiral grooves proceed along the spiral grooves to gradually overflow the respective spiral grooves and overlie each other in a prescribed order before the individual resin streams form a uniform tubular stream in a die axial direction.

9 Claims, 4 Drawing Sheets

(a)

5,651,935

SPIRAL DIE AND LAMINATE PRODUCTION METHOD USING SAME

FIELD OF THE INVENTION AND RELATED ART

The present invention relates to a spiral die for extruding a tubular laminate resin product and a laminate production method using the spiral die.

It has been widely practiced to form a laminate resin film in order to attain properties not attainable by a film of a single resin species or a single resin layer. A representative example of such a laminate resin film may include one including a gas barrier resin layer which cannot be readily stretched independently and a resin layer which provides a stretchability to the gas barrier resin layer and exhibits a good adhesion with the gas barrier resin layer. As a suitable method for production of such a laminate resin film, a multi-layer inflation (or blown-film extrusion) method has been known.

Generally, to a forming die for the multi-layer inflation method, individual resins melt-extruded through respective extruders are supplied through respective pipe-like paths.

Forming dies may basically include (1) a spider-type, (2) a spiral-type, (3) a cross head-type, (4) a manifold-type, and further include combinations of these basic types. In any type of die, an individual resin separately flows along its path to be shaped into a tubular film and, after being adjusted to an appropriate thickness, is joined with another tubular resin stream similarly formed into a tubular film and flowing, to be laminated therewith into a multi-layer tube, which is then extruded through a die lip. In such a die, it is necessary to provide a number of tubular or cylindrical resin flow paths corresponding to a required number of laminated resin layers. Accordingly, if the number of laminated layers is increased to provide a laminate inflation film having an improved performance, the die becomes complicated and is size-enlarged correspondingly, so that the preparation, machining and assemblage of die parts become clearly complicated. This leads to a tremendous die preparation cost and not a few difficulties in assemblage and separation of die parts.

Several proposals have been made so as to form a laminate with a die having a simpler structure. For example, Japanese Patent Publication (JP-B) 55-23733 has proposed a method of supplying, at an intermediate point of a flow path in a spiral die, another melted resin stream from an inside of the flow path. Further, Japanese Laid-Open Patent Application (JP-A) 1-261426 has proposed a method of dispersing an auxiliary thermoplastic resin in a filming or flaky state in a base thermoplastic resin to provide a composite film expected to exhibit a laminate film-like performance. These methods however cannot be satisfactory from a viewpoint of providing a multi-layer laminate through simpler flow paths or with respect to accomplishment of a laminate effect.

On the other hand, a spiral die has been ordinarily used for producing a multi-layer inflation film. In the spiral die, it is generally desirable to form as large a number of spiral flow grooves as possible on a die ring or mandrel in order to form a melted resin into a thin tube with little thickness unevenness. In order to evenly distribute the melted resin to such a multiplicity of spiral grooves, the melted resin supplied from a side may be distributed via (reverse) tournament-form manifold grooves disposed at the peripheral surface of a die ring (JP-B 58-29209). The (reverse) tournament-form manifolds are intended to effect an even distribution of a single or individual species of melted resin.

SUMMARY OF THE INVENTION

In view of the above-mentioned problem, a principal object of the present invention is to provide a die, particularly a spiral die, of a simple structure yet capable of effectively producing a multi-layered laminate of plural resin species.

Another object of the present invention is to provide an effective laminate production method using such a spiral die.

As a result of our earnest study for accomplishing the above objects, it has been found possible to effectively produce a laminate including layers of plural species of resins laminated in a certain order by using (reverse) tournament-form groove manifolds, which have been conventionally used for even distribution of a single species of melted resin, for distributing plural species of melted resins in a prescribed order related with the certain order of lamination. The laminate thus produced has element resin layers which are disposed to be inclined with respect to two major surfaces of the laminate, but it has been also found that the laminate shows a property, such as a gas barrier property for example, which is equivalent to that of an ordinary laminate in which element resin layers extend in parallel with two major surfaces thereof.

According to the present invention based on the above knowledge, there is provided a spiral die for forming a laminate, comprising: an outer die ring, an inner die ring inserted into the outer die ring with a fit clearance therebetween, a plurality (m, a positive integer greater than 1) of spiral grooves each having a gradually decreasing depth disposed between the outer and inner die rings, and distribution paths for distributively introducing melted resin streams of a plurality (n, a positive integer satisfying n<m) of resin species in a prescribed order into said plurality (m) of spiral grooves, so that individual melted resin streams distributed to the spiral grooves proceed along the spiral grooves to gradually overflow the respective spiral grooves and overlie each other in a prescribed order before the individual melted resin streams form a uniform tubular stream in a die axial direction.

According to another aspect of the present invention, there is provided a method of producing a laminate comprising:

providing a spiral die including an outer die ring, an inner die ring inserted into the outer die ring with a fit clearance therebetween, and a plurality (m, a positive integer greater than 1) of spiral grooves each having a gradually decreasing depth disposed between the outer and inner die rings; and distributively introducing melted resin streams of a plurality (n, a positive integer satisfying n<m) of resin species in a prescribed order into said plurality (m) of spiral grooves, so that individual melted resin streams distributed to the spiral grooves proceed along the respective spiral grooves to gradually overflow the spiral grooves and overlie each other in a prescribed order before the individual melted resin streams form a uniform tubular stream in a die axial direction, thereby forming a tubular laminate in which said plurality of resin species are laminated obliquely with respect to a circumferential section of the tubular laminate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the present invention will be more specifically described principally with reference to an embodiment thereof for producing a laminated tubular product from a gas barrier resin A and a resin B with excellent stretchability and adhesiveness in parallel explanation of a conventional method.

Figures 1A, 1B:
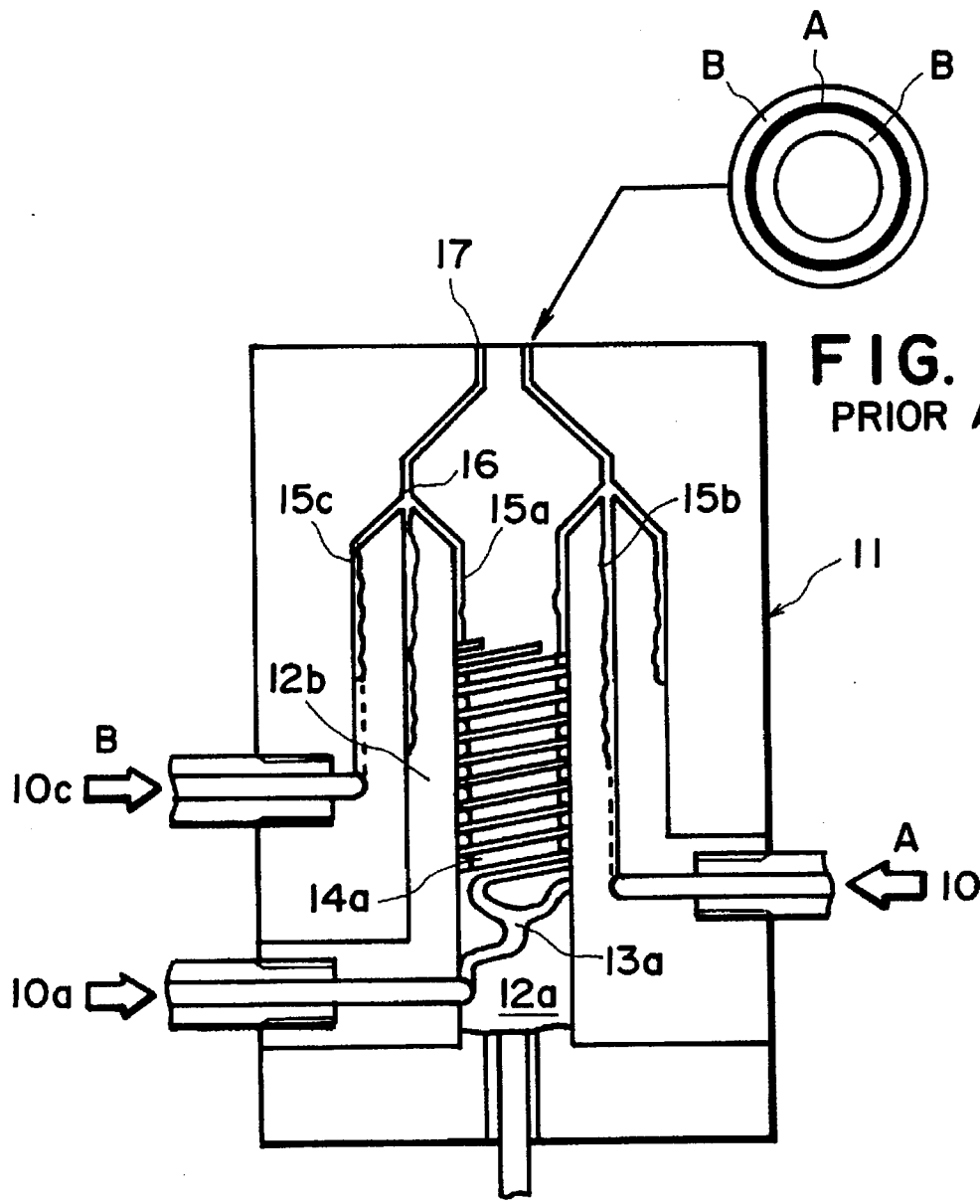
FIG. 1A is a longitudinal sectional view of a conventional multi-later spiral die and FIG. 1B is a cross-sectional view of a product film obtained therefrom.

FIG. 1A is a schematic longitudinal sectional view of a conventional spiral die for laminate production. Referring to FIG. 1A, a resin B extruded from an extruder 10a (not illustrated) and introduced into a spiral die 11 is guided to a so-called (reverse) tournament-form manifold 13a (only one of a plurality thereof being shown) disposed in proximity with the outer periphery of a first die ring (innermost ring) 12a where the resin B is uniformly diverged and introduced into a plurality of spiral (flow) grooves 14a disposed on the outer periphery of the first die ring 12a. Each spiral groove has a depth which gradually decreases as it goes in the proceeding direction (generally upward). The resin B flowing along the spiral groove 14a spirally proceeds upwards while forming an overflowing or leakage stream at a spacing from a second die ring 12b until it flows upwards as a uniform axial tubular stream along a groove-free tubular path 15a to reach a joining point 16. On the other hand, a resin A extruded from an extruder 10b and introduced into the spiral die 11 is similarly diverged and caused to form an overflowing or leakage stream to consequently form a uniform axial tubular stream flowing through a tubular path 15b and reach the joining point 16. Further, a melted resin stream B extruded from an extruder 10c similarly is diverged, forms an overflowing or leakage stream and then forms a uniform axial tubular stream flowing through a tubular path 15c to reach the joining point 16. Then, at the joining point 16, these three tubular streams of the melted resins B, A and B are laminated to be extruded through a die lip 17 to form a laminate tube. The laminate tube thus extruded out of the die lip 17 forms a laminated tubular product having a cross-section as shown in FIG. 1B and comprising an intermediate layer of gas-barrier resin A sandwiched with adhesive and stretchable resin layers B.

Figures 2A, 2B:
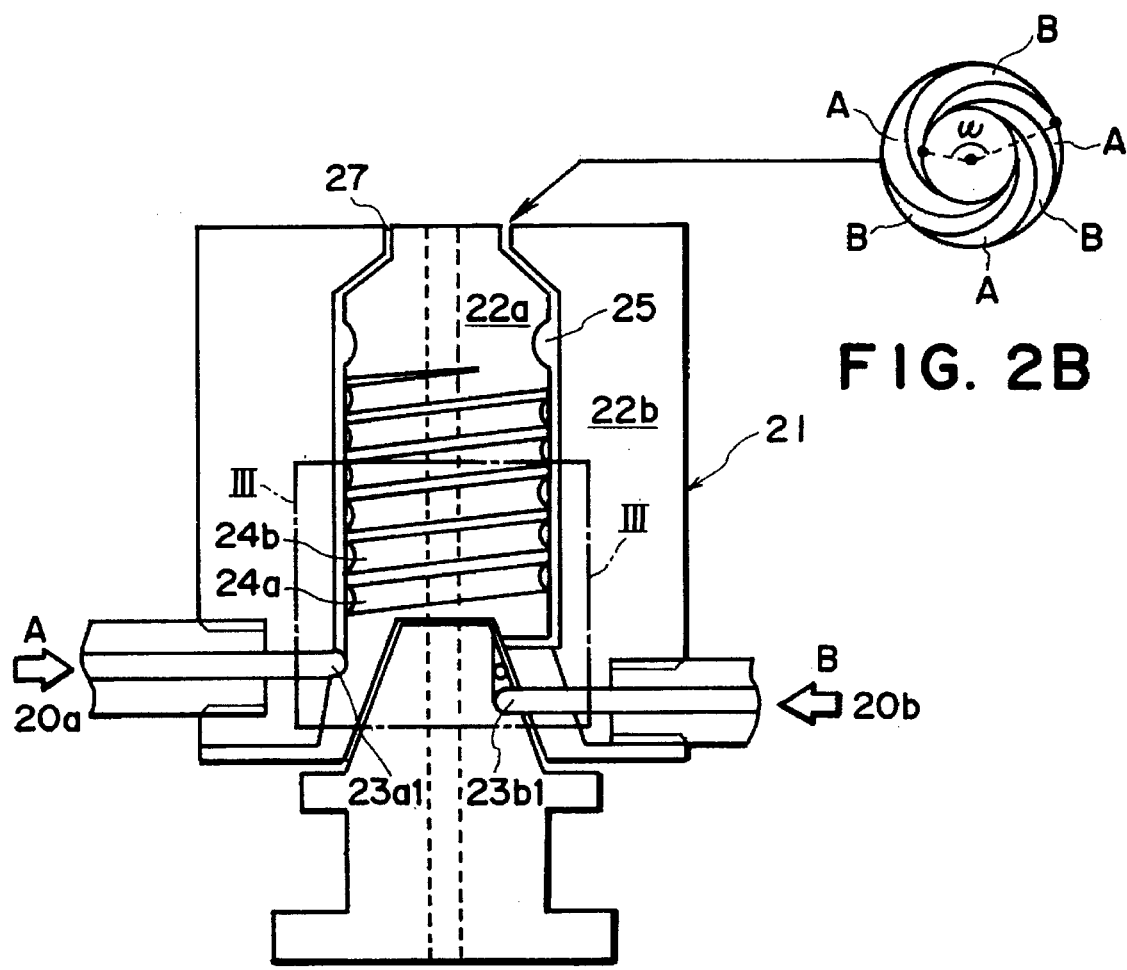
FIG. 2A is a longitudinal sectional view of an embodiment of the spiral die according to the present invention.
FIG. 2B is a schematic circumferentially cross-sectional view of a product film obtained therefrom.

In contrast thereto, FIG. 2A is a schematic sectional view of a spiral die 21 according to an embodiment of the present invention. Streams of melted resins A and B extruded out of extruders 20a and 20b and introduced into the spiral die 21 are respectively diverged through (reverse) tournament-form manifolds (not shown but described hereinafter) each per se being similar to the one denoted by reference numeral 13a shown in FIG. 1A and introduced into respective spiral grooves 24a and 24b each provided in a plurality. These melted resin streams A and B are then caused to flow along these spiral grooves as spiral streams accompanied with an overflowing stream and upwards through a single tubular path between an inner die ring 22a and an outer die ring 22b where the melted resin streams A and B are alternately laminated obliquely to flow through a groove-free tubular path 25 to be extruded through a die lip 27. The thus-extruded laminate tube forms a laminated tubular product having a circumferential cross-section (i.e., a cross-section in a transverse direction (TD) perpendicular to the extrusion axis) schematically as shown in FIG. 2B wherein layers of the resin A and B are alternately laminated obliquely the two major surfaces.

Figure 3:
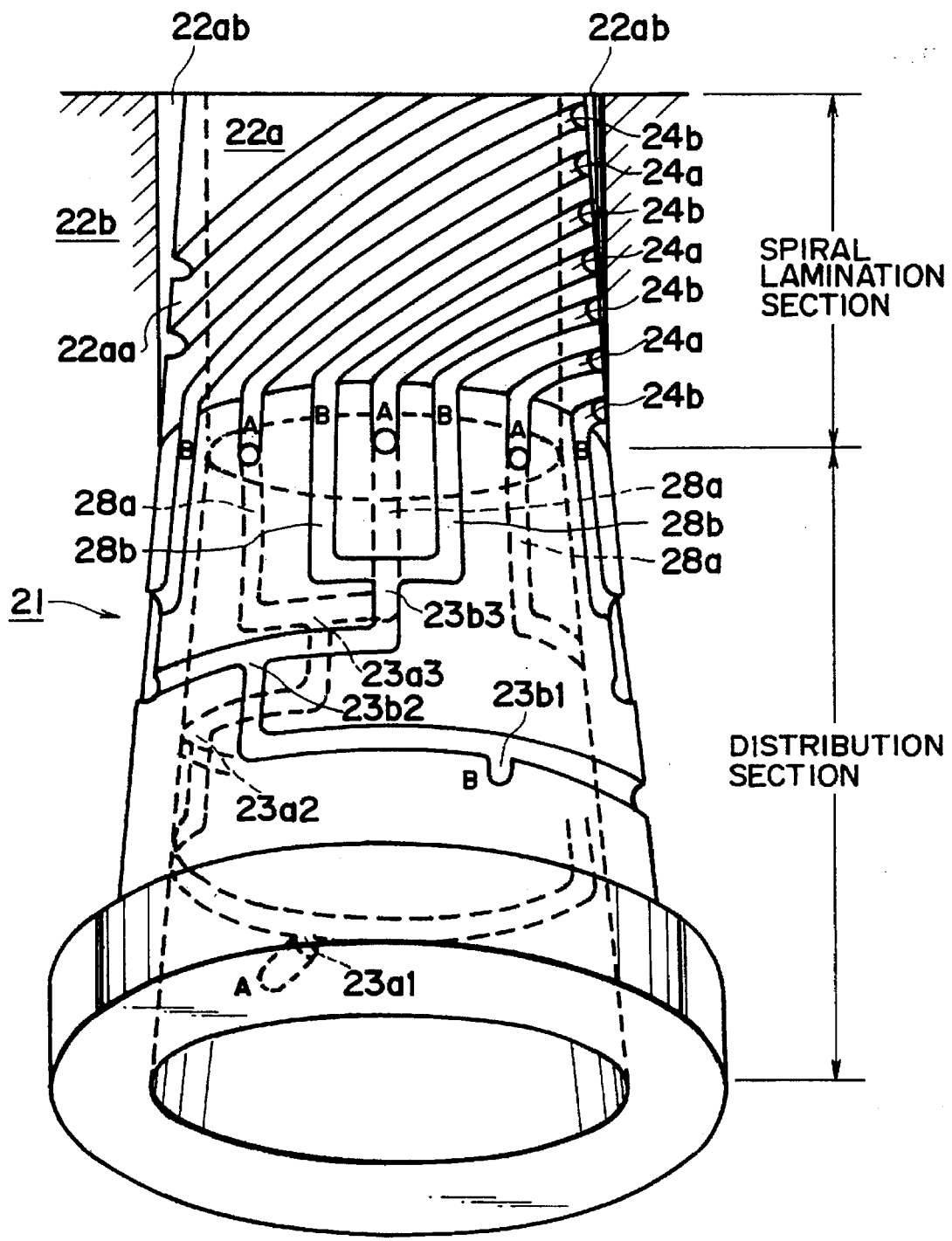
FIG. 3 is a schematic perspective enlarged illustration of an essential part of the spiral die shown in FIG. 2A.

FIG. 3 is a schematic perspective view of a part enclosed within a frame III drawn with a dot-and-dash line in FIG. 2A for illustrating the manner of distribution-lamination of the melted resin streams A an B. Referring to FIG. 3, the melted resin streams A and B extruded out of the extruders (20a and 20b in FIG. 2A) and introduced into the spiral die 21 first reach tournament manifold points 23a1 and 23b1, from which the melted resin streams A and B are repeatedly diverged through manifold points 23a2, 23b2 . . . and flow through final manifold points 23a3 and 23b3 to be introduced into final paths 28a, 28b, 28a, 28b . . . in a distribution section. From the final paths 28a, 28b . . . , the melted resin streams A and B are caused to alternately flow into spiral grooves 24a, 24b, 24a, 24b . . . Incidentally, the initial points of the spiral grooves 24a, 24b, 24a, 24b . . . (i.e., the terminal points of the final paths 28a, 28b, 28a, 28b . . . in the distribution section) may preferably be disposed substantially on an identical circular circumferential line on the inner die ring 22a. The melted resin streams A and B having entered the spiral grooves 24a and 24b initially exclusively proceed as spiral streams along the spiral grooves 24a and 24b but gradually form leakage streams overflowing spiral ridges 22aa of the inner die ring 22a and flow upwards in a path 22ab between the inner die ring 22a, particularly the spiral ridges 22aa thereof, and the outer die ring 22b. In other words, the melted resin streams A and B overflow out of the respective spiral grooves as if they form films flowing circumferentially. Then, the thus-formed flowing films of melted resins A and B are laminated to overlie the flowing films of melted resins B and A issued from the spiral grooves 24b and 24a, respectively, at the downstream side, i.e., so that the flowing films A and B alternately overlie each other to be laminated with each other. The angle of the lamination coincides with a spreading angle ω (FIG. 2B) of each resin stream overflowing out of each spiral groove. More specifically, each resin stream forms an outer surface portion of the product laminate tube at the initial point of an associated spiral groove and gradually proceed toward the inner surface while being laminated or covered with other resin streams to reach the inner surface when it moves by the spreading angle ω. Thus, each of the resin steams A and B is laminated obliquely for a spreading angle ω (FIG. 2B). The spreading angle ω can be controlled for each of the resins A and B by changing the initial depth, gradual thickness-reducing rate, etc., of the spiral groove 24a or 24b but may be in the range of generally 60–720 degrees, preferably 80–360 degrees, more preferably 130–230 degrees. In case where the spreading angle ω is below 60 degrees, the resultant laminate is liable to be accompanied with a thickness irregularity. On the other hand, above 720 degrees, the pressure in the spiral die at the time of the forming is liable to be excessive, so that the forming of the laminate becomes difficult.

Referring again to FIG. 2A, the laminate tube extruded out of the die lip 27 may be optionally subjected to an inflation step for circumferentially enlarging and thinning the laminate and then shaped into a sheet or a film (hereinafter inclusively referred to as "film" without intending to particularly restrict the thickness thereof) by slitting the tubular laminate ordinarily in a direction parallel to the forming axis.

Figure 4A:
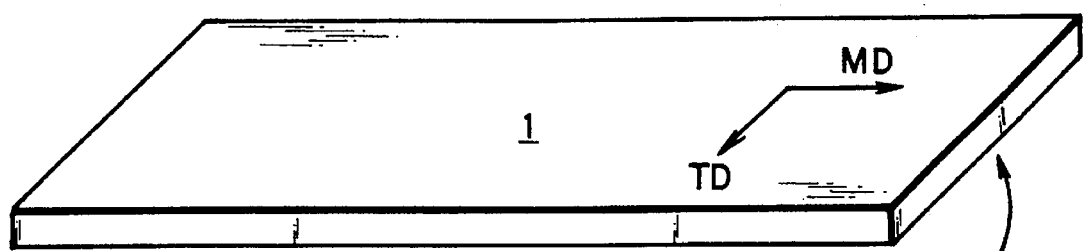
FIG. 4A is a perspective view of a laminate resin film prepared according to an embodiment of the method of the present invention.
Figure 4B:
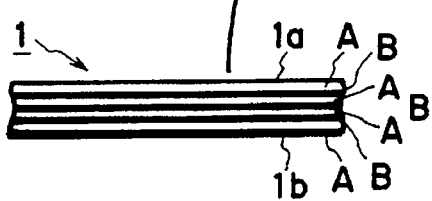
FIGS. 4B and 4C are schematic views, of an MD section and a TD section, respectively, of the resin film.
Figure 4C:
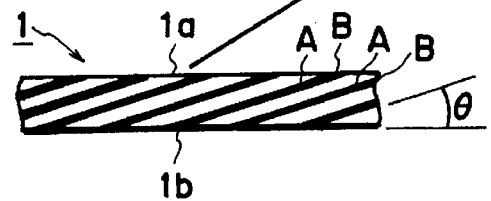

FIG. 4A is a schematic perspective view of a laminate resin film thus-obtained according to the present invention, FIG. 4B is a view of a section thereof taken in a direction (MD) parallel to the forming axis (the axial direction of the spiral die described above), and FIG. 4C is a view of a section thereof taken in a TD direction (a circumferential direction perpendicular to the spiral die axis). As is clear from FIGS. 4B and 4C, the laminate resin film 1 has an MD section showing the resin layers A and B laminated alternately and in parallel with the two major surfaces (FIG. 4B) but has TD section showing the resin layers A and B laminated alternately and obliquely so that the respective resin layers A and B reach the two major surfaces 1a and 1b of the laminate resin film 1 (FIG. 4C). The individual resin layers A and B form with respect to the two major surfaces 1a and 1b an angle θ, which however is not so large as shown in FIG. 4C but maybe in the range of larger than 0 deg. and at most 4 deg., particularly 0.001–0.4 deg. The angle θ may be calculated according to the following equation:

tanθ=[film thickness (mm)]/[whole peripheral length of the tubular film (mm)×spreading angle (ω deg.)/360 deg.]

Figure 5A:
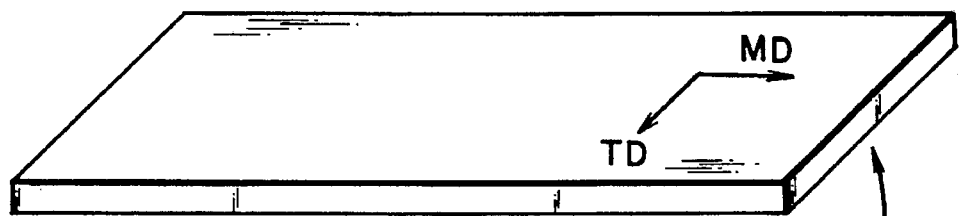
FIG. 5A is a perspective view of a conventional laminate resin film.
Figure 5B:
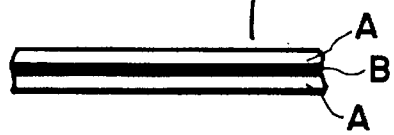
FIGS. 5B and 5C are schematic views, of an MD section and a TD section, respectively, of the resin film.
Figure 5C:
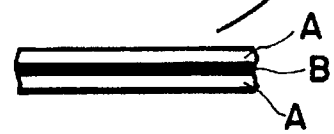

The obliquely laminated structure shown in FIGS. 4A–4C is believed to be characteristic in clear contrast with a laminated structure as shown in the corresponding FIGS. 5A–5C of a laminate resin film obtained by using a conventional multi-layer spiral die wherein the element resin layers A and B uniformly extends to the edges and in parallel to the two major surfaces both in the MD and TD directions.

As a result of such a characteristic obliquely laminated structure, the laminate resin film obtained according to the method of the present invention has properties in its thickness direction (such as compressibility, gas barrier characteristic, etc.) which are equivalent to those of a conventional parallel lamination-type but properties in a direction of planar extension, particularly in the TD direction, which are preferentially governed by one of the component resins showing a smaller mechanical property, such as Young's modulus or yield stress, and include a larger degree of deformability as a whole. These properties may be suited for deep drawing, skin forming or packaging, etc. Further, it has been confirmed that a stretched film obtained by uniaxially or biaxially stretching the obliquely laminate resin film shows a high shrinkability and a small Young's modulus. These properties lead to a tight-fitting characteristic and a low-temperature shrinkability which are desirable when the stretched film is used, e.g., as a vacuum packaging material for foods.

In the above, a description has been made to an alternate lamination structure of two resin species A and B (A/B/A/B/A/B ... ). However, the order of the lamination can be arbitrarily selected, inclusive of repetition, such as A/B/B/A/B/B/A ... or A/B/B/A/A/B/B/A ... , e.g., for such two resins A and B. In order to provide a laminate resin film having a uniform property as a whole, it is preferred to form a laminated resin product having a constant order of repetitive lamination. It is of course possible to form a laminate including three or more resin species. For example, three resin species A, B and C may be laminated, e.g., as follows:

A/B/C/A/B/C/A ... ,
A/B/C/B/A/B/C/B/A ... ,
A/B/A/B/C/A/B/A/B/C ... ,
A/B/C/B/A/B/C/B/A ...

In the case of producing a laminate according to the method of the present invention, the plurality (n, a positive integer≧2) of mutually different resin species for lamination may preferably be 2–4. On the other hand, the plurality (m, a positive integer satisfy n<m) of spiral grooves, i.e., the total number of the spiral grooves 24a, 24b, etc., may preferably be 4–256, further preferably 8–128, particularly preferably 16–64. Further, the number of thicknesswise laminated layers at a particular planar position of the laminate resin film may preferably be 4–100 layers, particularly 6–20 layers. The number of thicknesswise laminated layers may be calculated as m×ω/360 from the above-mentioned number of spiral grooves m and spreading angle ω. The total thickness of the laminate resin product or laminated resin film may be controlled in a wide range, e.g., by using a melt-extruded parison as it is or controlling the degree of inflation (stretching ratios), and may for example be in the range of 10 μm–1 mm, preferably 15–200 μm. Further, it is also preferred in many cases to coat at least one of the two major surfaces of an obliquely laminated resin film as shown in FIGS. 4A–4C with at least one layer of a resin species which is identical to or different from the resin species constituting the laminated resin film.

Hereinbelow, an Example of producing a laminated resin film by using a die according to an embodiment of the present invention will be described together with Comparative Example.

EXAMPLE

A spiral die (m=16) for forming an oblique laminate capable of alternately introducing and processing two resins as shown in FIG. 2 was used to effect a simultaneous tubular extrusion at an extrusion temperature of 180°–210° C. and a die temperature of 200° C. to form a laminate tube in a manner generally as described above. The laminate tube was then subjected to biaxial stretching by the inflation method to obtain a multi-layer stretched film. The stretched film was composed of an oblique laminate comprising totally 6 μm-thick layers of EVOH and totally 12 μm-thick layers of EMAA and including totally 6–7 laminated layers in its thicknesswise direction, wherein EVOH was saponified ethylene-vinyl acetate copolymer ("EVAL EPE-105", mfd. by Kuraray K.K.; ethylene content=44 mol. %, saponification degree=99.4%, melt-viscosity (at 200° C., 25 sec$^{-1}$)= 901 Pa.S), and EMAA was ethylene-methacrylic acid copolymer ("1207C", mfd. by Mitsui DuPont Polychemical K.K.; methacrylic acid content=12 wt. %, melt-viscosity (at 200° C., 25 sec$^{-1}$)=450 Pa.S).

Some representative physical properties and mechanical properties of the thus-obtained film are shown in Table 1 appearing hereinafter.

The properties shown in Table 1 include tensile strength, yield stress, elongation, shrinkage in hot water, Young's modulus and oxygen permeability measured with respect to the stretched film.

Incidentally, the spiral die for oblique laminate formation had the following features.

<Spiral Die>

| | |
|---|---|
| Number of spiral grooves | 16 (= 8 + 8) |
| Number of spiral turns | 1.5 |
| Spiral pitch | 6.875 mm |

Depth and width of spiral grooves:

| | | depth (mm) | width (mm) |
|---|---|---|---|
| For EVOH | initial | 10 | 5 |
| | terminal | 0 | 0 |
| For EMAA | initial | 6.5 | 5 |
| | terminal | 0 | 0 |

Gap between a spiral ridge (on the inner die ring) and the outer die ring:

| | |
|---|---|
| initial | 0 mm |
| terminal | 1.5 mm |

Diameter of the inner die ring:

| | |
|---|---|
| initial | 100 mm |
| terminal | 97 mm |

<Measurement method>

The respective properties shown in Table 1 were measured in the following manner.

1. Tensile strength, Yield stress and Elongation

These properties were measured by using a universal testing machine ("Tensilon RTM-100", mfd. by Orientec K.K.) according to JIS K-7127 under the following conditions.

| | |
|---|---|
| Sample length (gripper span) | 50 mm |
| Sample width | 10 mm |
| Crosshead speed | 500 mm/min |
| Test temperature | 23° C. |
| Test humidity | 50% RH |

The tensile strength and elongation represent measured values at the rupture.

2. Shrinkage in hot water

At least 5 pairs of 10 cm-distant points were marked for each of MD and TD directions on a stretched sample film, and the sample film dipped in hot water at a prescribed temperature (=70°, 80° or 90° C.) for 10 sec. Immediately after taking out the sample film, the sample film was cooled in water at room temperature. Then, the distance between each pair of marked points was measured, and a subtraction of the measured distance from the original 10 cm was expressed in percentage as a shrinkage. The values indicated in Table 1 are respectively an average of at least 5 values measured in this manner.

3. Young's modulus of elasticity

Measured by using a universal testing machine ("Tensilon RTM-100", mfd. by Orientec K.K.) according to JIS K-7127 under the following conditions.

| | |
|---|---|
| Sample length (gripper span) | 100 mm |
| Sample width | 20 mm |
| Crosshead speed | 10 mm/min |
| Test temperature | 23° C. |
| Test humidity | 50% RH |

4. Oxygen permeability

Measured by using an oxygen gas permeability apparatus ("Oxtran 100", mfd. by Modern Control Co.) according to JIS K-7126 under the following conditions.

| | |
|---|---|
| Test temperature | 30° C. |
| Test humidity | 100% RH |

5. Melt-viscosity

Measured by using a rotating viscometer ("DSR", mfd. by Rheometrics Co.) under the following conditions.

| | |
|---|---|
| Test temperature | 200° C. |
| Shear rate | 0.1–1000 sec$^{-1}$ |
| Geometry | parallel plates |
| Gap | 2 mm |

The melt-viscosity value described herein was calculated at a shear rate of 25 sec$^{-1}$ based on the above-measurement.

COMPARATIVE EXAMPLE

A three-layer tube was formed by simultaneous extrusion through an ordinary three-layer spiral die and then simultaneously stretched biaxially according to the inflation method to provide a three-layer stretched film for comparison. The resultant stretched film had the following lamination structure.

| | EMAA/EVOH/EMAA | | |
|---|---|---|---|
| Thickness (μm) | 6 | 6 | 6 |

The used resins of EVOH and EMAA are the same as these used in Example above.

The measured properties of the stretched laminate film are also shown in Table 1 appearing hereinafter.

As described above, the present invention provides a spiral die of a simple structure yet capable of effectively producing a multi-layer laminate of plural resins, and also a process for effectively producing such a laminate by using the spiral die.

TABLE 1

Physical-Mechanical Properties

| | Comp.Example | Example |
|---|---|---|
| Structural elements (thickness (μm)) | | |
| Resin A | EVOH (6) | EVOH (6) |
| Resin B | EMAA (12) | EMAA (12) |
| Total thickness (μm) | 18 | 18 |
| Number of spiral grooves | — | 16 |
| Number of laminated layers | 3 | 6–7 |
| Stretching ratio | MD 3.0 | MD 3.0 |
| | TD 3.0 | TD 3.0 |
| Stretching Temperature (°C.) | 80 | 80 |

TABLE 1-continued

Physical-Mechanical Properties

|  | Comp.Example | Example |
|---|---|---|
| Properties of stretched film | | |
| Tensile strength (MPa) | MD 30 | MD 25 |
|  | TD 30 | TD 28 |
| Yield stress (MPa) | MD 21 | MD 12 |
|  | TD 23 | TD 13 |
| Elongation (%) | MD 400 | MD 410 |
|  | TD 390 | TD 440 |
| Shrinkage in hot water (stretched film) | | |
| 70° C. | MD 18 | MD 23 |
|  | TD 18 | TD 23 |
| 80° C. | MD 28 | MD 34 |
|  | TD 28 | TD 34 |
| 90° C. | MD 32 | MD 37 |
|  | TD 32 | TD 37 |
| Young's modulus (MPa) | | |
| Non-stretched film | MD 522 | MD 360 |
|  | TD 542 | TD 324 |
| Stretched film | MD 1110 | MD 944 |
|  | TD 1180 | TD 910 |
| Stretched film after shrinkage in | MD 340 | MD 260 |
| 80° C. water | TD 343 | TD 243 |
| Oxygen permeability Stretched film ($cm^3/m^2$ .24 h.atm) | 220 | 220 |
| Spreading angle ω (deg.) | — | 150 |
| Layer inclination angle θ (deg.) | — | 0.003 |

What is claimed is:

1. A spiral die for forming a laminate, comprising:
   an outer die ring having an inner surface,
   an inner die ring inserted into the outer die ring and having an outer surface facing the inner surface of the outer die ring,
   a plurality (m, a positive integer greater than 1) of spiral grooves each having a gradually decreasing depth disposed on the outer surface of the inner die ring or on the inner surface of the outer die ring, and
   distribution paths each communicating with one of the spiral grooves for distributively introducing melted resin streams of a plurality (n, a positive integer satisfying n<m) of resin species in a prescribed order into said plurality (m) of spiral grooves, so that individual melted resin streams distributed to the spiral grooves proceed along the spiral grooves to gradually overflow the respective spiral grooves and overlie each other in a prescribed order before the individual melted resin streams form a uniform tubular stream in a die axial direction, thereby forming a tubular resin laminate in which said plurality of resin species are laminated in layers extending obliquely with respect to a circumferential section of the tubular laminate so that each layer of said plurality of resin species substantially extends to outer and inner surfaces of the tubular laminate.

2. A spiral die according to claim 1, wherein m is 4–256 and n is 2–4.

3. A spiral die according to claim 1, wherein said plurality (m) of spiral grooves are formed on a peripheral surface of said inner die ring.

4. A spiral die according to claim 3, wherein said plurality of spiral grooves are caused to have initial points which are disposed on a substantially identical circular circumferential line on the inner die ring.

5. A method of producing a laminate comprising:
   providing a spiral die including an outer die ring having an inner surface; an inner die ring inserted into the outer die ring and having an outer surface facing the inner surface of the outer die ring; and a plurality (m, a positive integer greater than 1) of spiral grooves disposed on the outer surface of the inner die ring or on the inner surface of the outer die ring; and
   distributively introducing melted resin streams of a plurality (n, a positive integer satisfying n<m) of resin species in a prescribed order into said plurality (m) of spiral grooves each having a gradually decreasing depth, so that individual melted resin streams distributed to the spiral grooves proceed along the spiral grooves to gradually overflow the respective spiral grooves and overlie each other in a prescribed order before the individual melted resin streams form a uniform tubular stream in a die axial direction, thereby forming a tubular resin laminate in which said plurality of resin species are laminated in layers extending obliquely with respect to a circumferential section of the tubular laminate so that each layer of said plurality of resin species substantially extends to outer and inner surfaces of the tubular laminate.

6. A method according to claim 5, further comprising an inflation step for circumferentially enlarging and thinning the tubular laminate.

7. A method according to claim 5, further comprising a step of slitting the tubular laminate in its direction of elongation to form a planar laminate.

8. A spiral die according to claim 1, wherein the tubular resin laminate has 4–100 layers.

9. A method according to claim 5, wherein the tubular resin laminate has 4–100 layers.

* * * * *